United States Patent Office 3,451,055
Patented June 17, 1969

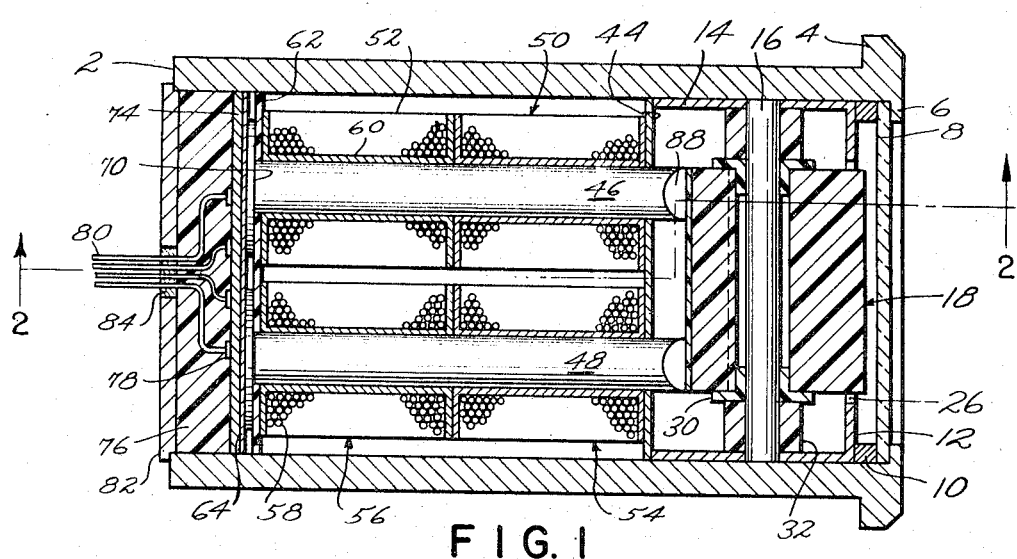

3,451,055
ELECTROMAGNETIC INDICATOR HAVING CONTROL MAGNETS AS STOP MEMBERS
George E. Pihl, Abington, Mass., assignor to Miniature Electronic Components Corp., a corporation of Massachusetts
Filed June 15, 1966, Ser. No. 557,719
Int. Cl. H01h 47/12; G08b 5/24
U.S. Cl. 340—373                                      12 Claims

ABSTRACT OF THE DISCLOSURE

A two position indicating device including a rotatable member including a pair of permanent magnets which can rotate between two limit positions determined by the core pieces of a stationary electromagnetic structure. A layer of a fluorocarbon material separates the permanent magnets from the core pieces to provide a working gap. The rotatable member carries two indicia, a different one of the indicia being visible in each of the two limit positions.

---

This invention relates to miniature electromagnetic indicators and more particularly to indicators capable of indicating two different predetermined conditions.

The primary object of this invention is to provide an improved miniature electromagnetic indicator capable of reliable binary indication.

Another object is to provide a new quick-acting binary electromagnetic indicator that is self-latching in each of its two display positions.

A further improvement is to provide a self-latching electromagnetic indicator that does not display a false indication under the influence of shock or vibration.

Still another object is to provide a miniature electromagnetic indicator that is adapted for pulse operation, requires relatively low input power, is designed for rapid assembly, and embodies a magnetic circuit that latches its indicator member in each of two predetermined display positions.

A more specific object of the invention is to provide an electromagnetic indicator comprising a rotatable indicator member and an electromagnetic assembly for operating the indicator member comprising means for mechanically determining the limits of movement of the indicator member.

In a preferred embodiment of the invention the foregoing and other objects are achieved by a construction comprising a rotatable drum-type indicator member provided with two permanent magnets and electromagnetic means operative to rotate the indicator member, the electromagnetic means comprising two pole pieces that mechanically determine two limits of movement of the indicator member and coact with the aforesaid permanent magnets to magnetically latch the indicator at each limit position, and a plurality of coils adapted for energization so as to rotate said indicator member to its two limit positions selectively. In the preferred embodiment of the invention two coils are provided on each pole piece, with each coil on one pole piece being connected in series with a coil on the other pole piece. Each pair of series connected coils is connected to its own pair of terminal leads so that two distinct and separate inputs are required to rotate the indicator member to first one and then the other of its two limit positions. Each pair of series connected coils is arranged so that the magnetic field of one coil is polarized in a direction opposite to the magnetic field of the other coil, and the input pulses are always applied so as to provide a force of repulsion on the nearest of the two magnets carried by the indicator member. In an alternative embodiment only one coil is associated with each pole piece; however, the input pulses are still applied so that the force initiating movement of the indicator member is one of repulsion rather than attraction.

Other objects and many of the attendant advantages of the present invention will become more readily apparent from the following detailed specification when considered together with the accompanying drawings, wherein:

FIG. 1 is a longitudinal sectional view of a preferred embodiment of the invention;

FIG. 2 is a longitudinal sectional view of the same preferred embodiment taken along line 2—2 of FIG. 1;

FIG. 3 is an end view looking from right to left in FIG. 2; and

FIG. 4 is a schematic circuit diagram illustrating the present invention.

Turning now to FIGS. 1–3, the construction and manner of assembling the illustrated embodiment will now be described. The indicator device comprises a cylindrical case 2 that preferably is made of a suitable metal such as aluminum but also may be made of a strong plastic material. The case is formed with open ends, one of which has an external flange 4 and an internal lip 6. Flange 4 is provided for mounting the indicator to an instrument panel. The internal lip 6 functions as a shoulder for a disc 8 that may be made of clear glass or a transparent plastic and functions as a window. The window disc 8 is held against lip 6 by a spacer ring 10 which in turn is restrained by the end wall 12 of an inverted cylindrical cup 14. The latter has in its side wall two diametrically opposed holes that accommodate the opposite ends of a stainless steel shaft 16. Positioned on this shaft is an indicator member in the form of a plastic drum 18. This indicator member has a circularly curved surface 20 having two discrete areas illustrated for convenience by the raised portions 22 and 24 (FIG. 2) that carry appropriate legends. The legends may be in various forms and may constitute words or symbols or other indicia. Thus, for example, the legends may consist merely of differently colored segments, typically one green and the other red. In the illustrated embodiment the legend on raised portion 22 consists of the word "GO" (FIG. 3), while the other legend (not shown) on raised portion 24 consists of the phase "NO GO." The end wall 12 of cup 14 is provided with an aperture 26 sized so as to display only one legend at a time at each of two predetermined limit positions of the indicator member. The latter is rotatably supported on shaft 16 by two plastic bearing sleeves 30. These sleeves are prevented from sliding away from the indicator member by like plastic sleeve spacers 32 that engage the inner surface of the side wall of cup 14.

The indicator member 18 is notched to accommodate two permanent bar magnets 36 and 38 of rectangular cross section that are cemented in place. The two magnets are mounted in reverse so that the north pole of one and the south pole of the other are located adjacent one end of the indicator member and the opposite poles of the same magnets are adjacent the opposite end of the indicator member. The side surfaces of the two magnets located furthest from the curved surface of the drum are covered fully by a sheet of plastic material 40. The latter preferably is made of Teflon and is cemented to the magnets and the indicator drum. The purpose of plastic sheet 40 is explained hereinafter.

Movement of the indicator member 18 is effected by energization of electromagnetic means now to be described. The electromagnetic means comprises a brass disc 44 that engages and bears against the open end of cup 14, two soft iron pole pieces 46 and 48, four solenoids 50, 52, 54 and 56 each comprising a coil of wire 58 wound on a plastic bobbin 60, a plastic insulator disc 62, and a soft iron disc 64. Solenoids 50 and 52 are mounted in tandem on pole piece 46 with the end of the bobbin of solenoid 50 engaging and pressing against brass disc 44. Solenoids 54 and 56 are mounted in tandem on pole piece 48 with the end of the bobbin of solenoids 54 also pressing against disc 44.

Insulator disc 62 has two holes through which extend pole pieces 46 and 48 and the latter are provided with end flanges 70 that engage the insulator disc and press it against the adjacent ends of the bobbins of solenoids 52 and 56. The soft iron disc 64 is sandwiched between the flanged ends of pole pieces 46 and 48 and a printed circuit board 74. The latter is secured in place by a suitable insulating potting compound 76 such as epoxy resin. The outer surface of printed circuit board 74 is provided with four conductive lands 78 to which are anchored four separate terminal leads 80. An end plate 82 made of the same material as case 2 is cemented to the latter over the potting compound 76. End plate 82 has a central aperture through which are brought out terminal leads 80. This central aperture is sealed with a suitable insulating material 84.

The brass disc 44 is provided with two holes through which extend pole pieces 46 and 48. The latter protrude beyond disc 44 far enough to intercept indicator member 18 and their protruding ends are beveled so as to provide wedge-shaped points defined by two converging surfaces 88 and 90 that meet along a line extending parallel to shaft 16. Surfaces 88 of the two pole pieces determine a first limit position of indicator member 18 while surfaces 90 determine a second limit position. FIG. 2 illustrates the first limit position. Movement of indicator member 18 clockwise from the position in FIG. 2 will bring it to its second limit position.

Referring now to FIGS. 1, 2 and 4, the coil of solenoid 50 is connected in series with the coil of solenoid 56 and the coil of solenoid 52 is connected in series with the coil of solenoid 54. The four free ends of these coils are brought out through suitable holes (not shown) in discs 62 and 64 and are connected to separate ones of the lands 78 of printed circuit board 74. Each pair of coils is connected so that when they are coupled in series with a power source 94 as shown in FIG. 4, the magnetic field of one coil will be polarized opposite to the magnetic field of its companion coil. In practice the indicator is coupled to the energizing power source through suitable switching means represented schematically as switch 96 that determines which pair of coils is energized. The switching means may be manually or automatically operated and may, for example, be a relay or an electronic switching circuit arranged to respond to a sensor or transducer. The signal required to operate the indicator consists of a pulse of relatively short duration. Hence in this preferred embodiment of the invention, power source 94 is of a type adapted to provide a steady D.C. output and switch 96 is of the momentary acting type so as to pass a short pulse of current when it is actuated. Other circuit arrangements for selectively energizing the two pairs of series connected coils are believed obvious to persons skilled in the art.

The device as above described and illustrated operates as follows: Assume that indicator member 18 is located in its first limit position (FIG. 2) so that the north pole of magnet 36 is proximate to pole piece 46 and the south pole of the same magnet is proximate to pole 48. Assume now that switch 96 is actuated so as to pass a short current pulse through solenoids 50 and 56 and that energization of solenoids 52 and 54 will produce two oppositely polarized magnetic fields, one of which will cause the wedge-shaped end of pole piece 46 to act as a north magnetic pole and the other of which will cause the corresponding end of pole piece 48 to act as a south magnetic pole (as demonstrated by the letters N and S shown in full lines in FIG. 4). Since the pole pieces are spaced so as to be aligned with the ends of magnets 36 (and also magnet 38), pole pieces 46 and 48 will direct repelling magnetic forces at the adjacent north and south poles respectively of magnet 36, whereupon the indicator member will be impelled to rotate clockwise from the limit position of FIG. 2 to its second position wherein magnet 38 is proximate to the pole pieces and magnet 36 is spaced from the pole pieces by an amount corresponding to the spacing of magnet 38 in FIG. 2. The repelling force is sufficiently strong to cause the indicator member to move almost instantaneously with energization of solenoids 50 and 56. As the indicator member rotates clockwise away from the position of FIG. 2, the magnetic field of magnet 38 exerts a stronger influence on the pole pieces until at same undetermined point the movement of the indicator member is due as much to attraction of the pole pieces to magnet 38 as it is to its inertia. After solenoids 50 and 56 have been deenergized, the indicator member will be held in the second limit position by virtue of the continued attraction of the pole pieces for magnet 38. Restoration of the indicator to its first limit position is accomplished by energizing solenoids 52 and 54 so that the wedge-shaped end of pole piece 46 acts as a north magnetic pole and the corresponding end of pole piece 48 acts as a south magnetic pole. Since the north and south poles of magnet 38 are now located proximate to pole pieces 46 and 48, the magnet will be repelled, causing the indicator member to rotate counterclockwise back to its original position illustrated in FIG. 2. The indicator member will be held in this new position even after solenoids 52 and 54 have been deenergized due to the attraction of the pole pieces to magnet 36.

As indicated earlier the time duration of the current pulses applied to the solenoids to effect a change of position of the indicator member is relatively short and may even be as short as half the transit time of the indicator member. The important thing is that the pulses must have an amplitude sufficient to reverse the polarity of the magnetism in the pole pieces which has been induced by the presence of the nearest one of permanent magnets 36 and 38.

An alternative embodiment of the invention involves omitting one coil from each pole piece, e.g., omitting coils 52 and 56. This alternative embodiment is energized in the same manner as described above, so that movement of the indicator member is initiated by magnetic repulsion. This alternative embodiment has a substantially slower response than the preferred embodiment since the electromagnetic repelling force is confined to one pole piece while the other pole piece is attracted to the adjacent one of magnets 36 and 38.

It is significant to note that the Teflon sheet 40 acts to provide a small non-magnetic gap between the magnets 36 and 38 and pole pieces 46 and 48 in the two limit positions of the indicator member. This gap is essential to proper operation of the indicator. While sheet 40 may be made of some other material having the desired electrical characteristics, use of a polyfluorocarbon resin such as Teflon is preferred because such plastics have little or no tendency to adhere to most other materials. Providing a non-stick surface for the indicator member where it engages the pole pieces is important considering the relatively weak magnetic forces to which the indicator member is subjected. The overall design of the device makes possible rapid operation with relatively little power input, yet assures firm latching of the indicator member in the absence of an input signal. It also is important to note that the invention as represented by embodiment herein described and illustrated is adapted for rapid assembly with the various components and sub-assemblies being insertable in order starting with the transparent window disc 8.

Indicators embodying this invention have application in a variety of electronic systems, including systems installed in airborne vehicles such as jet aircraft and rockets. They are particularly useful in places where illuminated indicators provide insufficient contrast with ambient light or have a tendency to premature failure due to shock and vibration.

I claim:
1. An electromagnetic indicator comprising a pair of spaced apart pole faces, a shaft having an axis of rotation which is substantially parallel to a line passing through said pole faces, an indicator member rotatably mounted on said shaft, permanent magnet means attached to said indicator member, and electromagnetic means operatively coupled to selectively magnetize said pole faces to cause rotation of said indicator member from one to the other of two predetermined positions by magnetic repulsion of said magnets, said permanent magnet means being in magnetic contact with said pole faces in each of said two predetermined positions.

2. An indicator as defined by claim 1 wherein said indicator member is provided with at least one predetermined legend, and further wherein said indicator includes means for concealing said legend when said member is in one of said positions and revealing said legend in the other of said positions.

3. An indicator as defined by claim 1 wherein said permanent magnet means is operative to hold said indicating means in a selected one of said two positions when said electromagnetic means is not energized.

4. An indicator as defined by claim 1 wherein said pole faces are disposed to intercept one portion of said indicator member when said member is in one of said positions and another portion of said indicator member when said member is in the other of said positions to thereby provide mechanical stops for limiting the movement of said indicator.

5. An indicator as defined by claim 4 wherein said indicator member includes means for preventing direct contact between said magnets and said cores.

6. An indicator as defined by claim 1 wherein said permanent magnet means includes a pair of oppositely polarized bar magnets each disposed parallel to said shaft, one of said bar magnets being in magnetic contact with said pole faces in one of said predetermined positions and the other of said bar magnets being in magnetic contact with said pole faces in the other of said predetermined positions.

7. In an indicator of the character described the combination of electromagnetic means including two pole pieces in said by side relation to each other and two coils surrounding portions of said two pole pieces, an indicator member with two permanent magnets attached thereto, said magnets mounted in reverse relation to each other so that the north pole of one magnet and the south pole of the other magnet are in corresponding positions, means supporting said indicator member for movement about an axis normal to the axes of said pole pieces between two alternate limit positions determined by said pole pieces in each of which the attraction of said pole pieces to one of said magnets tends to restrain said indicator member against movement toward the other limit position, said indicator member adapted to indicate different conditions in said two alternate limit positions, said two coils being adapted for selective energization so that one coil produces a magnetic field oriented to repel said indicator member away from one of said limit positions and impel it to the other of said limit positions and the other coil produces a magnetic field oriented to repel said indicator member away from said other limit position and impel it back to said one limit position.

8. A combination, as set forth in claim 7, further including a polyfluorocarbon resin layer on said magnets for maintaining a working gap between said pole pieces and said magnets in both of said limit positions.

9. A combination as set forth in claim 7 wherein said two magnets are bar magnets disposed parallel to each other.

10. A combination as set forth by claim 7 further including electromagnetic member disposed to magnetically couple said two pole pieces.

11. The combination of claim 7 further including an elongate housing enclosing said electromagnetic means and said indicator member, said housing having an aperture at one end thereof in proximity to said indicator member, said indicator member having indicia thereon disposed so as to be visible in said aperture in one of said limit positions and not visible in the other of said limit positions.

12. The combination of claim 11 wherein said pole pieces extend longitudinally of said elongate housing and said indicator member is mounted for movement on an axis extending transversely of said housing.

References Cited
UNITED STATES PATENTS

| | | | |
|---|---|---|---|
| 2,740,956 | 4/1956 | Hatton | 340—373 |
| 2,988,738 | 6/1961 | Baker | 340—373 X |
| 3,074,060 | 1/1963 | Kadlec | 340—373 |
| 3,026,512 | 3/1962 | Baker | 340—373 |

JOHN W. CALDWELL, *Primary Examiner.*

HAROLD I. PITTS, *Assistant Examiner.*

U.S. Cl. X.R.

317—155.5